United States Patent [19]

Speer

[11] 4,222,032
[45] Sep. 9, 1980

[54] VEHICLE COVER ALARM

[76] Inventor: Gary D. Speer, 3019 University Mall, Los Angeles, Calif. 90007

[21] Appl. No.: 838,573

[22] Filed: Oct. 3, 1977

[51] Int. Cl.² ............... B60R 25/10; G08B 13/08; G08B 13/14
[52] U.S. Cl. ............... 340/63; 200/61.62; 307/10 AT; 340/568
[58] Field of Search ............... 340/52 R, 63, 273, 275, 340/280, 282, 283, 547, 568; 307/10 AT; 200/61.14, 61.62, 61.84; 180/114; 296/136

[56] References Cited
U.S. PATENT DOCUMENTS

| 1,445,529 | 2/1923 | Mathews | 340/63 |
| 1,815,206 | 7/1931 | Mathews | 340/63 |
| 2,571,360 | 10/1951 | Hallerberg | 340/52 F |
| 3,281,785 | 10/1966 | Oursler | 340/63 |
| 3,555,534 | 1/1971 | Akers et al. | 340/282 |
| 3,706,090 | 12/1972 | Callaghan | 340/274 |
| 4,034,337 | 7/1977 | Haddock | 340/63 |

Primary Examiner—John W. Caldwell, Sr.
Assistant Examiner—Joseph E. Nowicki
Attorney, Agent, or Firm—William W. Haefliger

[57] ABSTRACT

A vehicle cover alarm includes certain structure on a vehicle cover cooperable with other structure on a vehicle and functioning to enable or activate an alarm when the certain structure is moved with the cover and relative to the other structure.

12 Claims, 6 Drawing Figures

VEHICLE COVER ALARM

BACKGROUND OF THE INVENTION

This invention relates generally to vehicle protective cover theft preventive devices, and more particularly concerns the provision of a signal producing means for detecting displacement of a protective cover with respect to the covered vehicle.

Covers are commonly used with vehicles such as automobiles to protect the automobile from damage due to exposure. The covers presently available range from simple plastic sheets draped over the automobile to expensive laminated and coated canvas covers that are substantially fitted to conform to the shape of the specific automobile, boat, trailer, or aircraft. Since these covers are valuable, a means is desired to prevent their theft. Prior means have included elastic bands or cords attaching the cover to the vehicle, and occasionally have included a hardwire connection of the cover to the vehicle to activate an alarm in response to the breaking of that hardwire connection. These prior devices have generally been cumbersome, time consuming in attaching or connecting when covering or uncovering the vehicle, generally unsophisticated, easily defeated by the thief, and many times require unsightly protrusions such as contact switches or master switches extending through a surface of the vehicle, such as the automobile fender. To my knowledge, no way was known to overcome these and other disadvantages prior to the present invention.

SUMMARY OF THE INVENTION

It is a major object of the invention to provide a means to prevent the theft or notify of the displacement of a vehicle protective cover, overcoming the above problems and also providing many additional advantages as will appear. Basically, the means comprises (a) a first means carried by the cover and extending adjacent to the vehicle, and (b) a second means, proximate the first means, carried by the vehicle, that produces a signal when the first means is displaced relative to said vehicle.

As will appear, the first means may typically incorporate magnets sewn into pockets in the cover, and the second means may comprise magnetic reed switches attached to a concealed inside surface of the vehicle. An optimum placement for automobiles is to generally position the switches on the inside surface of fenders in the wheel wells near the corners of the automobile. The magnets are positioned on the cover to be proximate the magnetic reed switches so that the switches detect displacement of the cover. The switches are then connected to an alarm circuit that actuates a warning device such as a horn or a vehicle disabling device such as a fuel pump power supply cut-off in response to a change in the condition of the switches caused by movement of the magnets due to displacement of the cover to which they are attached.

The device does not require any additional connections to the cover and may be simply activated by the usual positioning of the cover on the vehicle. The device provides theft protection without being easily noticed or defeated by the potential thief. The installation is simple and removeable and does not require any unsightly attachments to the surface of the vehicle. These and other objects and advantages of the invention will be more fully understood from the following description and drawings, in which:

DRAWING DESCRIPTION

DETAILED DESCRIPTION

Figure 1:
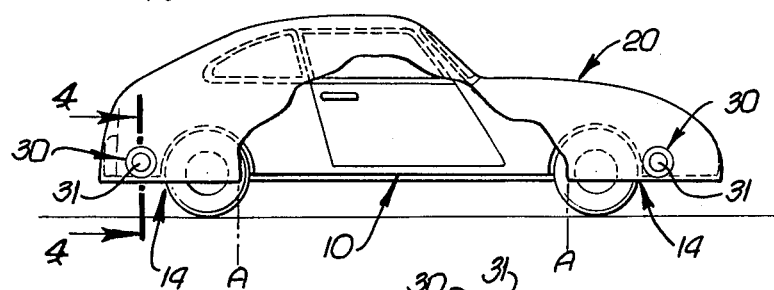
FIG. 1 is a side view part of an automobile with a protective cover in place and showing placement of portions of the invention, the view being partly broken away on line A—A.

FIG. 1 shows a preferred embodiment of the invention wherein the detector and signal means 30 of the alarm are located near corner portions of a vehicle, in this case, an automobile 10. Such means 30 is typically comprised of two portions, the first 31 being attached to the protective cover 20 of the automobile 10 and serving to activate the second portion 32 attached to the automobile 10. The first portion activates the second either by its presence, its displacement, or its motion relative to the second portion. The second portion 32, when activated by the first 31, serves to produce a signal as means to trigger the alarm 40 seen in FIG. 3. The alarm 40 may be comprised of circuitry for processing said signal and activating or deactivating warning devices or vehicle disabling devices included in the alarm 40.

Figure 4:
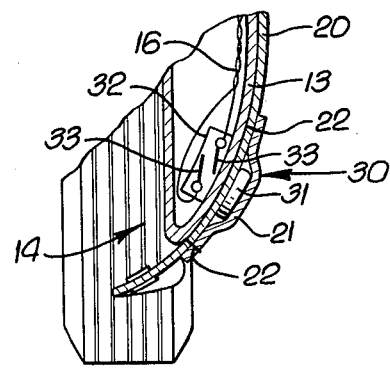
FIG. 4 is an end view of the automobile, cover, and invention portion of FIG. 1, taken in section along lines 4—4 of FIG. 1.

In the embodiment shown, the first means 31 comprises a permanent magnet. FIG. 4 shows the magnet 31 attached to the cover 20 by sewing it into a pocket of cover material 21, stitches appearing at 22.

The second portion 32 typically comprises a normally-open magnetic reed switch comprised of metallic fingers 33 that flex together to make electrical contact in the presence of a magnetic field. Each finger is then connected to the alarm system by concealed wires 16. The signal produced by the means shown is a binary ON-OFF connection to ground 11. FIG. 4 shows the placement of the second means, the magnetic reed switch 32, attached to the inside surface of the corner portion of an automobile fender 13, proximate the magnet 31 when the cover 20 is in position. The reed switch 32 is concealed behind the fender 13 in the wheel well 14 so that no hardwire connection need be made with the cover and so that there are no unsightly attachments to or through the surface of the automobile body.

Figure 2:
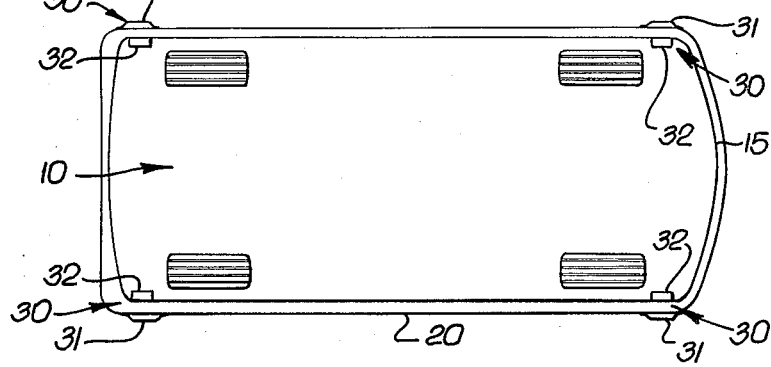
FIG. 2 is a simplified bottom plan view of the automobile and cover of FIG. 1, showing placement of portions of the invention.
Figure 3:
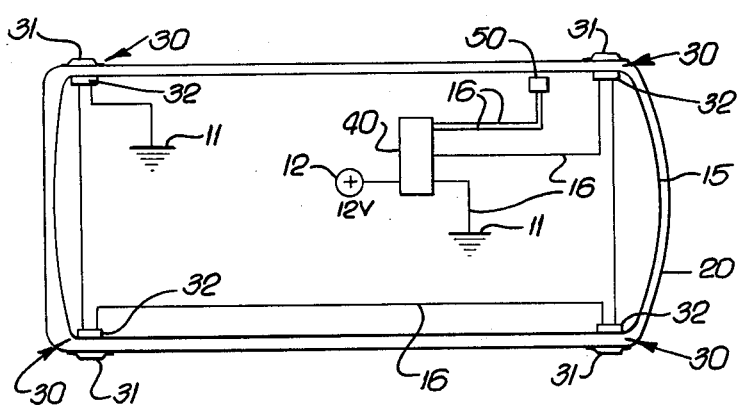
FIG. 3 is a schematic diagram showing the placement and interrelation of portions of the invention relative to a bottom view outline of the automobile of FIG. 2.

FIGS. 1–3 show the placement of four such magnet and magnetic reed switch combinations 31 and 32 near the four corners of the automobile 10. In FIG. 3, the placement is shown relative to the outline 15 of the automobile 10. This placement provides optimum theft protection for the cover 20 in that displacement of any portion of the cover 20 will displace at least one of the magnets 31 resulting in the respective magnetic reed switch 32 producing a signal which triggers the alarm 40.

Figure 5:
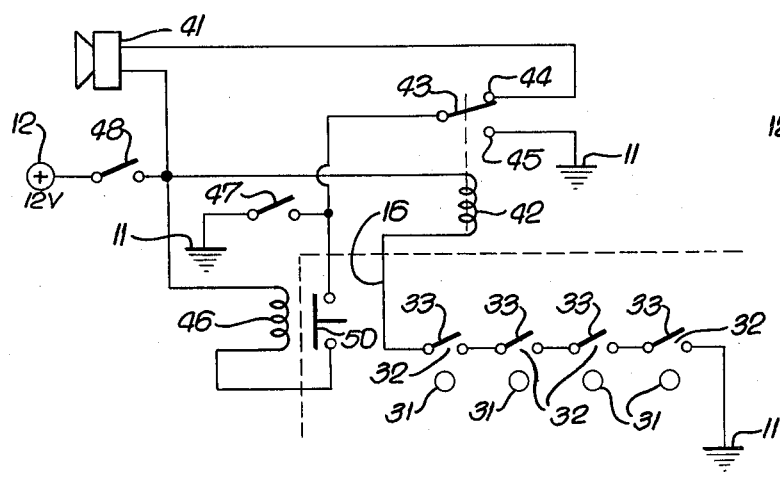
FIG. 5 is a schematic drawing of the invention, including alarm circuitry.

In its simplest form, the invention is a signal producing detector. Multiple detectors of this sort can be used in conjunction with many types of alarm systems. One configuration of alarm and detector portions is shown in FIG. 3. FIG. 5 details a simple electrical circuit compatible with the interrelation of portions in FIG. 3 and serving to activate a horn 41 in response to displacement of any corner of the cover 20.

FIGS. 3 and 5 show the normally-open magnetic reed switch second portions 32 connected at 16 in series, one end grounded at 11 to the automobile chassis 10. Also shown is the connection 16 of the alarm 40 to the automobile's power supply 12 and chassis ground 11, and a remote switch 50 located in the wheel well 14 to deactivate the alarm 40, in order to remove the cover 20.

In FIG. 5, the positioning of all four first portion magnets 31 proximate their respective second portion magnetic reed switches 32 closes those switches and thus completes a circuit from the power supply 12, through the coil of the switching relay 42, through the four reed switches 32, to ground 11. The energizing of the switching relay 42 pulls its moving contact 43 to engage the normally open contact 45 and thus completes a circuit from the power supply 12, through the coil of the holding relay 46, through the normally-closed remote switch 50, through the contacts of the switching relay 43 and 45, to ground 11. The resulting energizing of the holding relay 46 closes its normally-open contacts 47 so that its energizing circuit is maintained regardless of the condition of the switching relay 42 that activated it, i.e. a circuit is completed from the power supply 12, through the coil of the holding relay 46, through the remote switch 50, through the contacts of the holding relay 47, to ground 11. With this holding circuit engaged by the positioning of the cover 20 on the vehicle 10, the alarm system can be considered armed.

At this point, the alarm 40 can be either activated by the displacement of a corner of the cover 20 or disarmed by the remote switch 50. Lifting a corner of the cover 20 breaks the circuit through the series of magnetic reed switches 32 so that the switching relay 42 is no longer energized. The moving contact 43 of the switching relay 42 returns to its normally-closed position 44, completing a circuit from the power supply 12, through the horn or other suitable warning or disabling device 41, through the normally-closed switching relay contacts 43 and 44, through the holding relay contacts 47, to ground 11, and thereby sounds the alarm horn 41. The alarm 40 can then be deactivated by the remote switch 50 or by restoring the cover 20 to its proper position which closes the switching relay 42 contacts 43 and 45, as described above, and thus breaks the horn 41 circuit.

With the alarm 40 in either the armed condition or activated, it can be disarmed or deactivated by opening the normally-closed remote switch 50 and removing the cover 20. Opening the remote switch 50 disconnects the holding circuit through the holding relay 46, thus causing the normally-open holding relay contacts 47 to open, preventing the horn 41 circuit from being grounded again until all four corners of the cover 20 are replaced in position.

A power supply master switch 48 serves to disconnect the cover alarm system when not in use.

Figure 6:
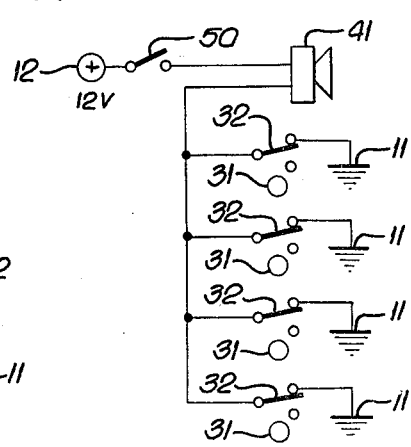
FIG. 6 is a modified circuit diagram.

One considered variation shown in FIG. 6 includes first and second portion detectors 32 corresponding to those described above at 30, and that operate as normally-closed switches. In this variation, the detectors 32 would be connected in parallel, each to ground 11 such that the lifting of any corner of the cover 20 would complete a direct circuit from the power supply 12, through a warning or vehicle disabling device 41, through the switch corresponding to the displaced corner of the cover 32, to ground 11. In this circuit a remote switch 50 located in a wheel well 14 would serve as a master switch to enable and disable the alarm 40, once the cover 20 was in position.

Besides magnetism, other field generating and detecting means can be used to produce a signal suitable for alarm type circuitry to activate a warning device such as a horn, siren, bell, radio signal transmission, to name a few or to activate a vehicle disabling device such as an ignition or power block or disconnect or a fuel cutoff. Other field generating and detecting means includes electrical capacitance wherein the first means is either the cover itself or includes a metallic plate sewn into the cover and the second means is a detector concealed behind the fender, as before, that detects changes in the capacitance of its environment. Said detector would detect the motion of the first means and cover and would trigger an alarm in response thereto.

The use of a simple switch-type on-off binary signal allows the cover detection means to be used in combination with most of the vehicle alarm systems available that detect the opening of doors to have other protective features.

Since no hardwire direct connection is required, the invention is adaptable for use with aircraft, boat, or trailer covers and accessories to which a first means can be attached to prevent their theft.

The description above are merely illustrative examples of some of the possible configurations of the invention. The scope of the invention is more specifically defined as follows:

I claim:

1. A plurality of devices for use with a vehicle to signal movement of a protective cover relative to the vehicle, and in combination with the cover, the vehicle having wheel well panels, the respective devices adapted to be located proximate the respective panels, each said device comprising
   (a) a first means carried by said cover and extending adjacent to the outer side of its associated wheel well panel, and
   (b) a second means, proximate said first means, and carried by said vehicle, that produces a signal when said first means is displaced relative to said vehicle, said second means located at the inner side of said associated wheel well panel,
   (c) and an alarm carried by the vehicle and wherein said plurality of second means include switches that are interconnected and also connected to said alarm such that said signal from any of said second means causes the alarm to activate.

2. The device of claim 1 wherein the class defined by the vehicle includes automobiles, trailers, boats, and aircraft.

3. The device of claim 1 wherein said cover is formed of protective material and substantially conforms to the exterior shape of the vehicle body, covering at least a part thereof.

4. The device of claim 1 wherein at least one of said first and second means are magnetically interreactive devices.

5. The device of claim 4 wherein said first means includes a magnet that forms a magnetic field.

6. The device of claim 5 wherein said second means includes a detector to detect the proximity of or changes in said magnetic field relative to the vehicle and to produce a signal in reponse thereto.

7. The device of claim 5 wherein said first means comprises a permanent magnet.

8. The device of claim 6 wherein said second means includes a magnetic reed switch.

9. The device of claim 1 wherein said switches include normally-closed switches that are connected in parallel and to said alarm.

10. The device of claim 1 including a disarming circuit including a remote switch connected with the alarm to disarm the alarm while the first means are being placed in positions adjacent the outer sides of said wheel well panels.

11. The device of claim 1 wherein the switches are connected in series.

12. A device for use with a vehicle to signal movement of a protective cover relative to the vehicle, comprising
 (a) a protective cover, and
 (b) multiple first means carried by said cover and extending adjacent to said vehicle, each one of said first means being located proximate to a respective corner portion of said vehicle, said multiple first means including multiple detector actuators for actuating multiple second means each one of which is carried by said vehicle proximate a respective corner portion of said vehicle, each one of said multiple second means functioning when actuated to detect movement of an associated one of said first means and said cover and thereby to individually effect signal production in response thereto.

* * * * *